Jan. 8, 1929.  1,697,924
R. LUSSO
PUMP OR HYDRAULIC POWER TRANSMISSION MACHINE
Filed July 3, 1924    2 Sheets-Sheet 1

Inventor
Rodolfo Lusso
J. L. Newton
Attorney

Inventor
Rodolfo Lusso

Attorney

Patented Jan. 8, 1929.

1,697,924

UNITED STATES PATENT OFFICE.

RODOLFO LUSSO, OF HABANA, CUBA.

PUMP OR HYDRAULIC POWER-TRANSMISSION MACHINE.

Application filed July 3, 1924. Serial No. 724,137.

This invention refers to an improvement in pumps or power transmission machines for pumping by being operated by any liquid fluids under hydrostatic pressure, such as water, glycerine, oils, and others, performing the work of a turbine as well as that of a pump.

In the attached drawing, the same letters refer to the same parts in all the figures of the drawing.

The machine to which this invention relates is composed of an exterior casing $a$ of a generally circular form, provided with two openings, ending respectively in two tubular portions $b$ and $c$. Inside the casing $a$ fits the drum $d$ Figs. 1 and 5, also of circular form but of smaller diameter than the exterior frame, in such a manner that between the drum and the frame is a space $e$ on one side of the periphery of the circle, Fig. 1; and on the other side the two surfaces of the drum and the frame may fit close together.

Figure 1:
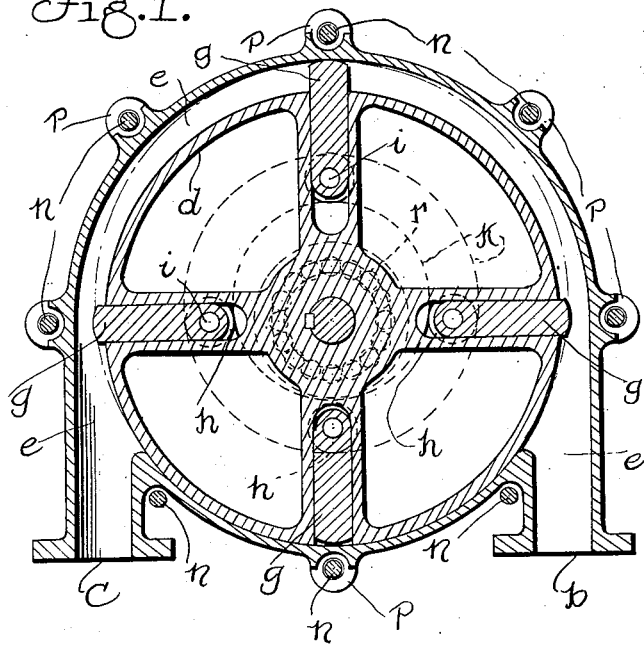
Figure 1 is a longitudinal section on the line AA in Fig. 2.
Figure 4:
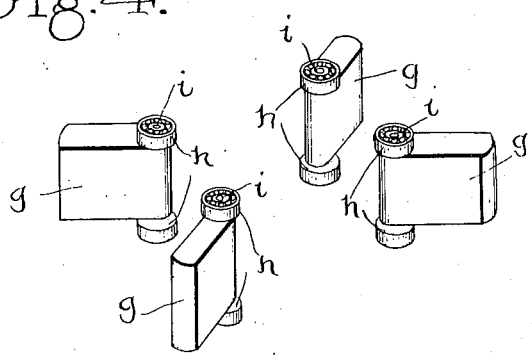
Fig. 4 is a detail perspective view of the four pistons.
Figure 5:
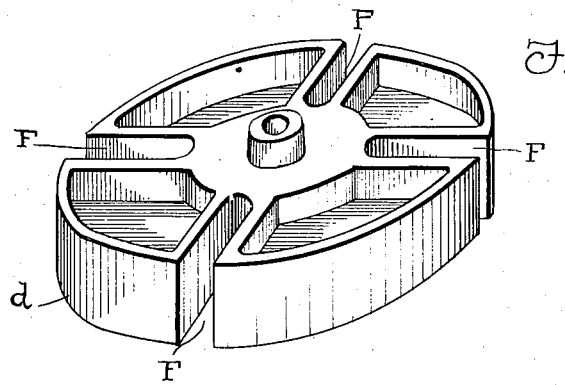
Fig. 5 is a detail perspective view of the rotation drum.

The drum $d$ is provided with four radially-disposed hollow slots $f$, Fig. 5 that serve as the receptacles of the same number of pistons or paddles $g$ Figs. 1 and 4, i. e. one paddle in each hollow, so that every paddle can slide radially along the hollows $f$. Each paddle is provided on its edges with two rollers or ball bearings $h$ fixed at the end of a trough bolt $i$. These ball bearings fit in circular grooves $k$ of both covers, so as to positively bring the paddles in proper place, when the drum is in circular motion.

Figure 2:
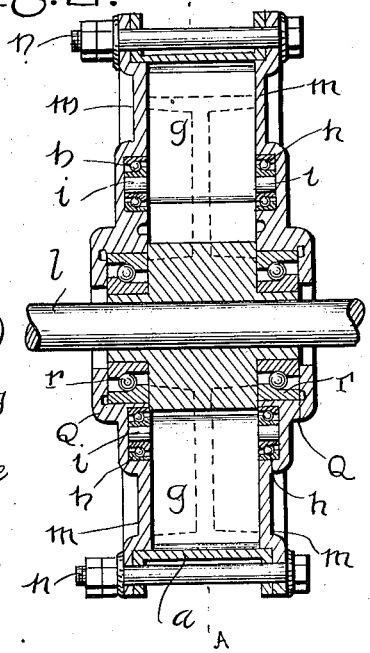
Fig. 2 is a sectional view of the machine taken at right angles to that of Fig. 1.
Figure 3:
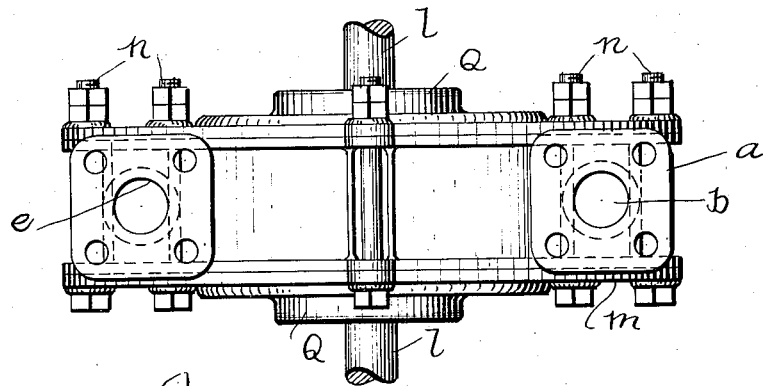
Fig. 3 is a plan view.
Figure 6:
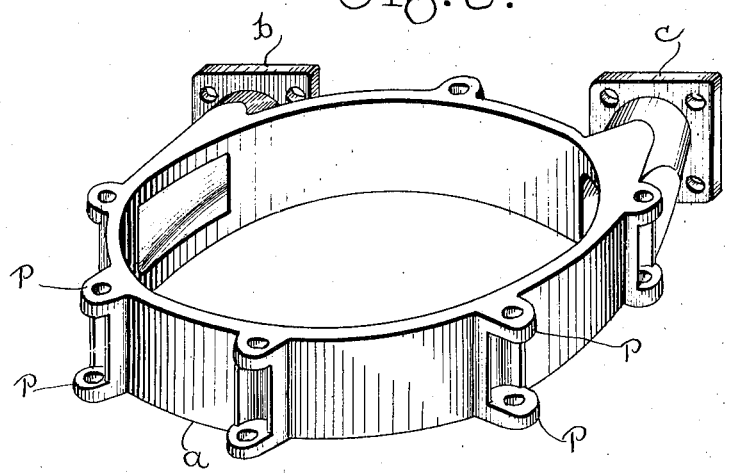
Fig. 6 is a detail perspective view of the exterior frame.
Figure 7:
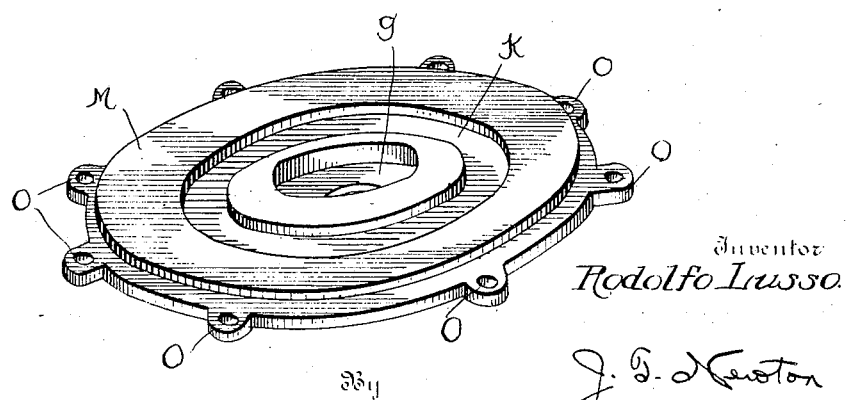
Fig. 7 is a detail perspective view of one of the two covers.

At the centre of the drum $d$ is fixed the axle $l$, Figs. 1 and 2. There are two covers $m$ Figs. 2, 3 and 7, fitted to close up hermetically the casing $a$, forming thus the body of the machine closed in all its parts, with the exception of both tubular apertures $b$ and $c$ provided for the reception and delivery of the liquids. The casing is held together by bolts $n$ placed around the casing in holes through caps $o$ and $p$, Figs. 2, 6 and 7.

The grooves $k$ of both covers are of circular form as explained, but are eccentrically disposed in regard to the centre of the axle $l$, Fig. 1.

The covers $m$ have each one depression where the ball bearings $r$ are located, acting as seats for the rotation of the drum $d$ and thus determining the relative position to the frame $a$.

When the device is used as a pump, power is applied to the shaft $l$ from some source not shown and the liquid pumped with equal facility from $b$ through $c$ or vice-versa in the ordinary way.

When the device is used as a turbine the liquid under hydrostatic pressure, enters one of the tubular apertures $b$ or $c$ at choice, traveling into the free space $e$ and meets here one of the four paddles that is intercepting the channel or free space between drum and frame. The pressure of the fluid acting on one side of the paddle compels the drum and the axle, keyed together, to a circular motion. As the liquid persistently enters the machine, the following paddle will be compelled the same as the first one, to move and displace it from its position and to perform the circular motion started before; thus obtaining a constant and regular revolution of the axle that can be transmitted to an exterior work.

When the drum $d$ makes the circular motion, the paddles are radially slid into the hollows $f$ of the drum, forced, by the ball bearings that follow the way of the grooves on both covers, so that the edges of the paddles will perform the circle pointed out with a dotted line in Fig. 1.

It will be noted from a careful inspection of my device that I have provided a long surface contact between the drum and the bottom periphery of the casing, and I have so arranged the grooves in the heads of the casing that the piston $g$ will be drawn slightly out of contact with the bottom portion of the casing. The upper portion of the grooves $k$ is circular in shape but arranged somewhat eccentric on its sides or else the inner periphery of the casing is so shaped that only one of the pistons $g$ is always in contact with the inner periphery of the casing. The pistons are guided and positively operated by the grooves so as to perform the functions above enumerated. I have found that after a slight wear of the parts a film of fluid seems to form between the periphery of the drum and the lower portion of the casing and if contact between these portions of the drum and casing are sufficiently extended, that this film will prevent the liquid from following the drum in its rotation to an appreciable extent, and the roller bearing further reduce the friction of the parts and these combined friction reducing provisions cause the engine to run with a minimum amount of friction.

Having described my invention what I claim as new is:

1. A pump comprising a casing having an internal periphery circular at its top and bottom portions with projecting peripheral lugs, said casing having inlet and outlet ports and a comparatively long bearing surface at its periphery between the ports, heads in the casing having grooves circular at their top and bottom portions, but eccentric to said casing with peripheral lugs and bolt holes, bolts passing through the lugs on the head and casing, a circular drum in the casing snugly fitting throughout its bottom peripheral area, the extended periphery at the bottom of the casing, but spaced from the top thereof, said drum having piston slots and pistons therein with ball bearings snugly fitting said slots in the heads, the slots being constructed so that one of said pistons is positively held in contact with one portion of the casing when the pump is in operation, but slightly withdrawn from the opposite portion.

2. A pump comprising solid end covers, each end cover having a hub portion and piston guiding groove, and a circumferential shoulder, a middle casing with inlet and outlet openings and having a circular portion extending between the inlet and outlet, said middle casing having a peripheral surface to fit around the peripheries of the shoulders of the end covers, the end covers and middle casing having flanges with bolt holes therein, and bolts to hold the end covers and middle casing together, and a circular piston drum with its periphery fitting a circular portion of the inner periphery of the middle casing.

3. A device of the character described comprising a casing having an internal periphery circular at its top and bottom portion said casing having inlet and outlet ports and heads with a hub opening and grooves therein circular at their top and bottom portions but eccentric to said casing said casing being provided with inlet and outlet openings, and flanged pipes extending downwardly therefrom to serve as a base for said device, and a circular portion extending between said openings, a circular drum having a ball bearing hub in said hub opening and also having piston slots and pistons therein with ball bearings snugly fitting said head grooves the head grooves being so shaped that each of said pistons in turn is positively held in contact with the upper portion of the casing but slightly drawn from the bottom portion as the drum revolves whereby a film of liquid is formed between the drum and casing and most of the weight of said drum is borne by the circular bottom portion of the casing to relieve the strain on the ball bearing hub.

In testimony whereof I hereunto affix my signature.

RODOLFO LUSSO.